United States Patent Office 3,256,339
Patented June 14, 1966

3,256,339
PROCESS FOR THE PRODUCTION OF
FORMALDEHYDE
Edward L. Cole, Glenham, and Edwin C. Knowles, Poughkeepsie, N.Y., assignors to Texaco Inc., New York, N.Y., a corporation of Delaware
No Drawing. Filed Dec. 29, 1960, Ser. No. 79,111
1 Claim. (Cl. 260—603)

This invention relates to a catalytic reaction and, more particularly, is concerned with a method for carrying out a reaction employing a supported catalytic structure.

During catalytic processing with solid particulate catalysts, the reactants are passed through a bed of porous catalyst particles, beads or pellets. In many such reactions employing organic materials at elevated temperatures, a carbonaceous deposit accumulates in the pores and openings of the catalyst as the process proceeds under continuous operating conditions. This deposition of carbonaceous material, commonly known as fouling of the catalyst, is a function of the reactants, the reaction products, and the conditions of the process and the catalyst. Certain types of reactions may be worse offenders than others. Fouling may be particularly excessive when the reactants or products remain in contact with the catalyst for a relatively long time. When a porous catalyst is used, the reactants diffuse into the interior or central portion of the catalyst particle and may be retained for an excessive period of time whereupon decomposition of the reactants and products result in fouling the catalyst. Fouling results, not only in a decrease in catalyst activity and loss in selectivity, but also in intensification of the heat transfer problem in the catalyst bed thereby resulting in local overheating or "hot spots," particularly during regeneration of the catalyst.

Heat transfer and temperature control in a catalyst bed often are difficult problems by reason of the heat of reaction which accompanies numerous catalystic reactions. Thus, in an exothermic reaction, for example, the heat evolved in processing may result in formation of local overheating or "hot spots" unless distributed substantially uniformly throughout the catalyst bed or otherwise dissipated from the reaction zone. Generally it is desirable, or essential, to maintain the reaction temperature within a predetermined range in order to obtain the maximum yield of desired products. Local overheating and temperature variations in the catalyst bed are therefore deleterious and may result in excessive coking of the reactants, inactivation of the catalyst, or otherwise cause undesired side reactions.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic or highly endothermic reactions, it has been proposed to incorporate pieces of metal or other suitable heat conductive solid material in the catalyst bed to facilitate heat transfer to the surroundings. Heat transfer and temperature control of the catalyst bed have been achieved by employing a gaseous or liquid heat-transfer medium usually circulated through a jacket surrounding catalyst filled tubes or through tubes extending into a catalyst bed. The reactants may be diluted with steam or an inert gas as a further means of achieving temperature control. However, the known or proposed methods regarding thermal control necessitate especially designed reactors, and further may require materials and equipment in addition to that normally employed.

In certain processing operations, the temperature may be controlled within the desired range by employing low flow rates or low conversion levels to limit the rate of heat released by the reaction. However, this normally results in a corresponding decrease in yield per unit of the reactor volume. Notwithstanding this precaution, uncontrollable local overheating and temperature variations in the catalyst bed may occur.

This invention has therefore as its purpose to provide in a catalytic reaction a catalytic structure capable of conducting heat to permit carrying out reactions under substantially isothermal conditions and characterized by relatively high activity over long periods of use. The catalytic structure of this invention is provided with an extended metal substrate exhibiting relatively high thermal conductivity which affords an effective means for adequately controlling the thermal conditions of the reaction thereby minimizing, or substantially eliminating, temperature variations in the reactor and local overheating and fouling of the catalyst. Equally important, our catalytic structure is not restricted to any particular configuration, and may comprise the walls of the reactor thereby obviating the need for employing a packed column of catalyst. As a result, the quantity of active catalyst material used in our catalytic structure is greatly reduced as compared to the quantity required in conventional structures. In some cases, a substantial portion of the structural and supporting members of the reactor can be eliminated. The improved catalyst structure of this invention permits compactness in design and often decreases substantially the capital costs and operating costs in catalytic reactions. It is significant that the foregoing and other objects are realized without diminishing the flow rates of the reactants, but, on the contrary, in many processes, the reaction rates may be greatly increased without any appreciable decrease in product yield. These together with other objects and advantages will be apparent to one skilled in the art upon reading the following description.

The novel catalytic structure of our invention involves broadly an extended metal substrate exhibiting relatively high thermal conductivity and capable of readily forming an adherent oxide coating or film. Metals found most useful include those selected from the group consisting of aluminum, tantalum, titanium, zirconium and hafnium. The integrally formed oxide film provides an active catalytic surface for use in a number of catalytic processes, conducted either in a liquid or vapor phase.

In accordance with the invention, the metal substrate employed in the catalytic structure is provided with an adherent oxide film, preferably a relatively porous and adsorbent oxide film, which serves as the active catalyst. The metal substrate is of extended dimensions and is particularly of a length and geometric surface area substantially greater than that of discrete particles. Metals found most useful and susceptible of rendering the desired oxide film include those selected from the group consisting of aluminum, tantalum, titanium, zirconium and hafnium. The metals may be in the form of a pure metal, a commercial metal containing the usual impurities, or a base alloy of the metal.

The oxide film may be produced by any of several known methods, including chemical and electrochemical methods, but must be of sufficient thickness to provide an adequate quantity of catalyst material. To insure adequate performance under the conditions encountered in catalytic processing, however, the artificially produced oxide film generally should not be substantially thinner than about 0.1 mil, and preferably not less than about 0.5 mil, usually about 0.5 to 1 mil being desirable. Where an aluminum metal substrate is employed, for example, the oxide film may be produced by treating the aluminum surface with a solution of an alkaline carbonate, usually a sodium carbonate-chromate solution. The film may be produced by the anodic oxidation of the metal surface whereby the metal is made the anode in an electrolytic solution. In anodizing aluminum, a 15% sulfuric acid solution is commonly employed as the electrolyte, but other acid electrolytes such as chromic acid, oxalic acid, phosphoric acid and sometimes boric acid may be used. Titanium, tantalum, zirconium and hafnium may be anodized advantageously in a boric acid-ammonia solution having a pH of about 8. In all cases, the oxide film to which this invention relates is produced by artificial means and does not include relatively thin natural oxide films occurring on metal surfaces which have been exposed to the atmosphere.

The present invention is particularly applicable to anodic films, and more especially to aluminum surfaces having an anodically produced film, and, therefore, will be described in more detail in connection with films of this type. Oxide films formed by this well-known commerical method are relatively porous and adsorbent, and though this constitutes a preferred embodiment of our invention, it should be understood that other conversion films, including barrier type films, are also useful in the preparation of the catalyst structure of our invention.

It will be observed that the catalytic structure of our invention may be advantageously employed in a number of catalytic reactions employing a feed stock comprising a hydrocarbonaceous material under suitable conditions of temperature and pressure. Hydrocarbonaceous material as used herein, and in the appended claims, is intended to include hydrocarbons and oxygenated hydrocarbons. Our catalytic structure is useful in the hydrogenation-dehydrogenation or hydration-dehydration of a wide variety of organic compounds, including paraffinic and aromatic compounds, or in the oxidation or polymerization of various organic compounds. Thus, for example, a number of unsaturated compounds containing an ethylenic or acetylenic linkage may undergo hydrogenation employing our catalytic structure, as will certain cycloolefins, for example, cyclohexene, and organic compounds containing oxygen, for example, aldehydes and ketones. Conversely, the catalytic structure may be useful in the dehydrogenation of a variety of organic compounds, as, for example, in the production of an olefin from a corresponding paraffin, or in the dehydrogenation of an alcohol to produce a corresponding aldehyde or ketone.

Referring now in greater detail to the catalytic structure of our invention and the attendant advantages, the extended metal substrate is initially provided with an artificially produced oxide film which is relatively thin as compared to the substrate. The extended metal substrate is not restricted to any particular configuration, and may include metal chain, wire, mesh, gauze, rods, balls, plates, saddles, sheets, tubes or the like, the members of the substrate not being less than about ⅛-inch in its maximum dimension, and more preferably ¼-inch, and of sufficient thickness on which the oxide film may be adequately produced and still maintain a free metal substrate. Generally, an oxide film of about 0.5 to 1 mil is sufficient, but thicker films, or thinner films, may be employed where desired. The thin oxide film defines the depth of the catalyst layer, and, therefore, limits the extent of diffusion of the reactants through the pores and openings in the catalytic material to this shallow depth. As a consequence, substantially all of the catalyst material is exposed to the reactants, and entrapment of the reactants in the catalyst is minimized or substantially eliminated. In this manner, we readily achieve with less catalyst material a reactive capacity equal to, or greater than, that accomplished by conventional catalysts.

Equally important, the catalytic structure of our invention functions substantially as an isothermal surface. During a catalytic process, heat transfer in the catalyst bed is readily accomplished by means of the extended metal substrate. Depending on the nature of the reaction, heat may be extracted from, or supplied to, the reactor through the metal substrate, thereby providing an adequate means for controlling temperature conditions in the catalyst bed. Thus, in an exothermic process, for example, the metal substrate will conduct the heat to the surroundings of the reactor, and the excess heat extracted therefrom preferably by means of a cooling medium employed in heat exchange relation with the catalyst.

The following examples will further illustrate our invention:

*Example I*

Aluminum chain of commercial purity, each link of the chain measuring approximately 7/16-inch, was anodized as follows: The chain was first desirably cleaned by conventional practice as by etching for one minute in a 5% aqueous sodium hydroxide solution at 150° F., rinsing with water, and then immersing in a 5% nitric acid solution for about 30 seconds at room temperature and again rinsing with water. The chain was then anodized in a 15% sulfuric acid electrolyte for 60 minutes with a current density of 12 amperes per square foot and at an electrolyte temperature of 68° to 74° F. The chain was rinsed with water to remove any residual acid, and then dried at 160° F. for 2 hours.

A hydrocarbon feed stock containing by weight about 47% diisobutylene and 53% n-heptane, was hydrogenated using 70 grams of anodized aluminum chain as the catalyst. The feed stock was charged to the reactor under the conditions of 600° F., 1,000 p.s.i.g. 0.7 liquid hourly space velocity, and at a mol ratio of hydrogen to hydrocarbon feed stock of 2. The product recovered at the end of three hours contained 23% diisobutylene and 24% isoctane, the balance being the unconverted n-heptane. In a blank run employing glass beads for purposes of comparing the catalytic activity of the anodized aluminum chain, the recovered product contained 43% diisobutylene thereby showing a substantial catalytic effect for the anodized aluminum.

*Example II*

Anodized aluminum chain, prepared as in Example I, and weighing 83 grams, was employed as the catalyst in the dehydration of 1-butanol. 145 milliliters of feed stock, containing about 99.80% by weight 1-butanol and 0.17% water, was charged to the reactor holding the catalyst for a one-hour period at atmospheric pressure at a temperature of about 650° F. Analysis showed a recovery of 86.8% by weight butene, about 4.5 ethylene, the balance of products recovered being other low molecular weight hydrocarbons and hydrogen.

*Example III*

Plates or bands of titanium, of commercial purity, measuring 4-inches by ½-inch by 1/32-inch, were anodized in a boric acid-ammonia solution having a pH of about 8. Anodization was continued for about 7 minutes at 17 volts with an initial current density of 150 amperes per square foot and at an electrolyte temperature of about 70 to 74° F. The anodized plates were formed into Raschig rings measuring about ½-inch in diameter.

Caprylene, having a boiling point of about 121° C., was polymerized in a tubular reactor using 41 grams of the anodized titanium rings as the catalyst. The reactor was pressured with nitrogen at 2,000 p.s.i.g. and 600 to 650° F. for five minutes. About 90% of the polymer oil product recovered from the reaction showed a boiling point above that of caprylene.

*Example IV*

68 grams of fine mesh tantalum wire was anodized under the same conditions as that employed for the anodization of titanium in Example III, and the anodized tantalum was used in the catalytic oxidation of methanol to formaldehyde. Air was used to evaporate the methanol charged to the reactor. The charge was treated under the conditions of 710° F. at atmospheric pressure and at a contact time of 0.62 second. Formaldehyde was recovered in a water wash tower, the unabsorbed gases including methanol, dimethyl ether and hydrogen. Selectively for the reaction was greated than 90%.

We claim:

A process for catalytic oxidation of methanol to formaldehyde which comprises passing a mixture of air and methanol vapor in relative proportions effective for conversion of methanol to formaldehyde into a reaction zone maintained at elevated temperature into contact with a catalytic structure consisting of an extended tantalum metal support having an oxide film of tantalum at least 0.5 mil thick integral with the surface thereof produced by anodic oxidation, withdrawing products of reaction comprising formaldehyde from said reaction zone, and recovering formaldehyde from said reaction products.

References Cited by the Examiner

UNITED STATES PATENTS

| | | | |
|---|---|---|---|
| 1,238,137 | 8/1917 | Hagemann et al. | 252—477 |
| 1,851,754 | 3/1932 | Craver | 260—603 |
| 2,270,874 | 1/1942 | Gwynn | 252—477 |
| 2,372,165 | 3/1945 | Arveson | 252—417 |
| 2,379,736 | 7/1945 | Miller | 252—477 |
| 2,437,648 | 3/1948 | Milas | 260—603 |
| 2,644,800 | 7/1953 | Mottern | 252—477 |
| 2,743,264 | 4/1956 | Buselli et al. | 252—477 |
| 2,826,724 | 3/1958 | Lilienfeld | 204—58 |
| 2,849,408 | 8/1958 | Bente | 252—477 |
| 2,866,692 | 12/1958 | Kautter et al. | 252—477 |
| 2,868,702 | 1/1959 | Brennan | 204—58 |
| 2,965,583 | 12/1960 | Houdry et al. | 252—477 |

LEON ZITVER, *Primary Examiner.*

JULIUS GREENWALD, *Examiner.*

W. S. BROWN, R. D. LOVERING, J. J. SETELIK, B. HELFIN, *Assistant Examiner.*